April 25, 1933.  L. S. FRAPPIER ET AL  1,906,053
FILM GATE SUPPORT FOR MOTION PICTURE PROJECTION MACHINES
Original Filed June 26, 1929
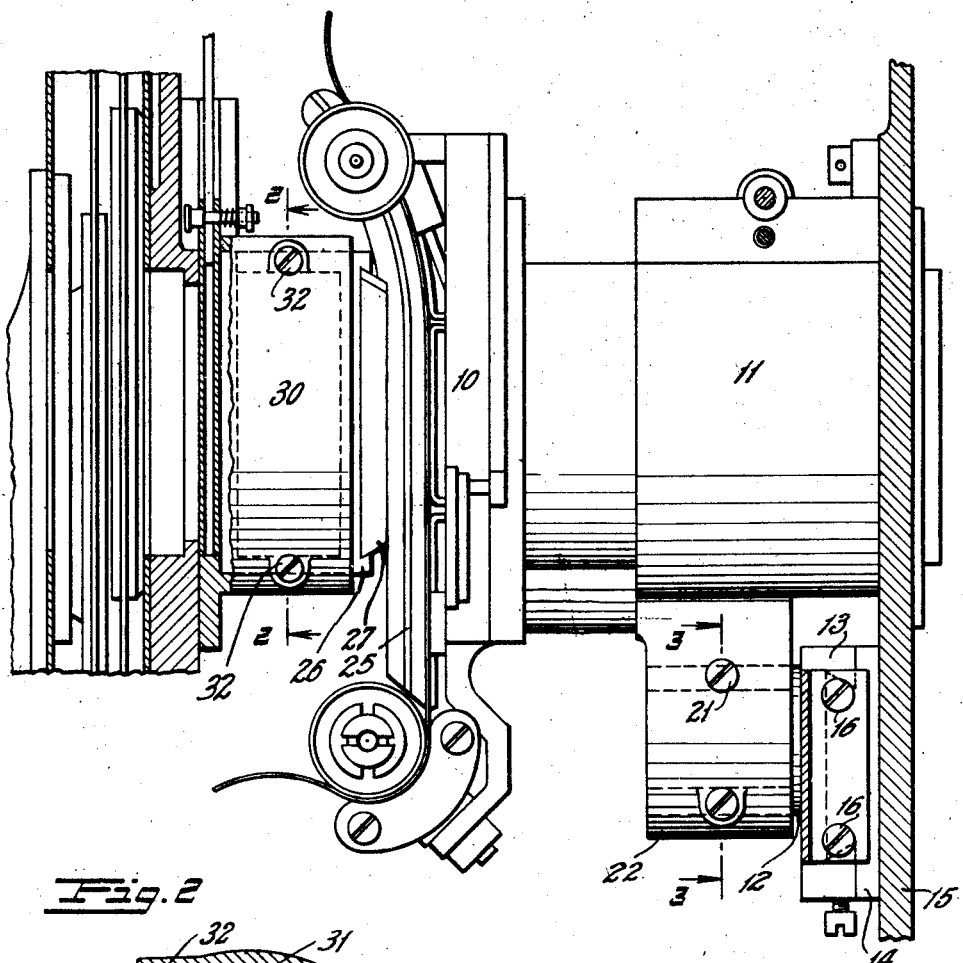
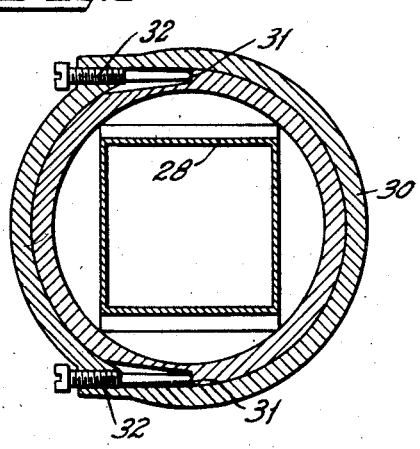
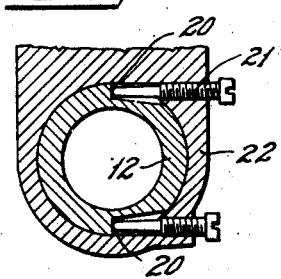
INVENTOR.
Louis S. Frappier
and Ewald Boecking
BY
Austin + Dix
ATTORNEYS Patented Apr. 25, 1933

1,906,053

UNITED STATES PATENT OFFICE

LOUIS SIMON FRAPPIER AND EWALD BOECKING, OF BROOKLYN, NEW YORK, ASSIGNORS TO INTERNATIONAL PROJECTOR CORPORATION, OF NEW YORK, N. Y., A CORPORATION OF DELAWARE

FILM GATE SUPPORT FOR MOTION PICTURE PROJECTION MACHINES

Original application filed June 26, 1929, Serial No. 374,676. Divided and this application filed July 22, 1930. Serial No. 469,669.

This invention relates to motion picture projection machines, and more particularly to a new and improved projection head for a machine capable of simultaneously projecting pictures and reproducing a sound record.

The present application is a division of our copending application Serial No. 374,676, filed June 26, 1929, for motion picture projection machine and relates particularly to the support for the film gate and the lens tube and the mechanism for adjusting the same.

An object of the present invention is to provide an adjustment for controlling the angular position of the film gate and aperture plate whereby these elements may be accurately aligned with each other and with the film.

A further object of the invention is to provide a cheap, simple, convenient and dependable mechanism of the type above indicated.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawing forming a part thereof, in which Fig. 1 is an enlarged detail view of the film gate and aperture plate and supporting mechanism therefor;

Fig. 2 is a section taken on the line 2—2 of Fig. 1; and

Fig. 3 is a section taken on the line 3—3 of Fig. 1.

Like reference characters denote like parts in the several figures of the drawing.

In the following description and in the claims parts will be identified by specific names for convenience, but they are intended to be as generic in their application to similar parts as the art will permit.

Referring to the drawing the present invention is disclosed as relating particularly to the upper film gate 10 of a motion picture projection machine. Said film gate is slidably supported in a telescoping housing 11 which is pivotally mounted on pin or stud 12 carried on a bracket 13. Said bracket is dovetailed for sliding movement on a supporting plate 14 which is firmly secured to the frame 15 of the projection machine in any convenient manner. Bracket 13 may be located on frame 14 in any convenient position by means of set screws 16. Pin 12 is provided with a pair of shoulders 20 (Fig. 3) against which screws 21 are adapted to rest. Said screws are threaded in arm 22 forming a part of housing 11 and by their position determine the pivotal position of said housing on stud 12. The particular form of film gate employed and the particular manner of mounting said film gate in housing 11 forms no part of the present invention and will accordingly not be set forth in detail herein. It is understood that any standard type of mechanism may be employed.

Aperture plate 25 is supported by a light tube 26 in any convenient manner as by flange 27 which dovetails in a suitable groove in said light tube. A cooling member 28 may be included within light tube 26 for extracting the heat of the projection light and preventing the same from being applied to the aperture plate and unduly heating the same.

Tube 26 is rotatably secured in a housing 30 and is provided with a pair of shoulders 31 (Fig. 2) against which screws 32 are adapted to rest. Said screws are threaded in housing 30 and by their position determine the angular position of the light tube. The particular construction of housing 30 and the mechanism associated therewith by which it is operatively mounted in a projection machine form no part of the present invention. It is understood that any standard type of apparatus may be employed. One type of aperture plate and film gate and support therefor which may be utilized is described more in detail in our copending application Serial No. 303,162, filed August 31, 1928, for improvements in projection machine.

The adjustment for the aperture plate and film gate permits these elements to be accurately aligned with the projection rays by the expenditure of a minimum amount of time and labor. Furthermore, the adjustment, when once obtained, is rigidly maintained due to the interlocking action of the adjusting screws 21 and 32. It will be noted that an extremely accurate adjustment may be obtained by the above construction inasmuch as the longitudinal position of the adjusting screws may be closely controlled. This feature is of importance in apparatus of the character described inasmuch as it is essential to maintain the film gate and aperture plate in their correct alignment.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a projection machine, a supporting housing for a film gate, a pin carrying said housing and having a pair of oppositely disposed shoulders and screws threaded in said housing and engaging said shoulders for rotatably adjusting said housing about said pin.

2. In a projection machine, a supporting housing for a film gate, said housing having a downwardly extending arm drilled to receive a pin, a pin carrying said housing and adapted to engage and support said arm, said pin having a pair of diametrically spaced shoulders formed thereon and screws threaded in said housing and engaging said shoulders for rotatably adjusting said housing about said pin.

3. In a projection machine having a supporting housing for a film gate, and means for mounting said housing in said machine comprising a stationary pin, said housing being journalled on said pin for movement about a horizontal axis and means for controlling the position of said housing with respect to said pin comprising a pair of diametrically opposite shoulders carried by one of the above elements and screws carried by the other element and engaging said shoulders, the relationship of said screws being such that the angular position of said housing with respect to said pin is controlled thereby.

4. In a projection head having an aperture plate, a support for said plate comprising a stationary housing, a member carrying said plate and journalled in said housing for movement about a horizontal axis, and means for controlling the angular position of said member with respect to said housing comprising a pair of diametrically opposite shoulders formed on said member and a pair of screws threaded in said housing and engaging said shoulders, the position of said screws determining the angular position of said member.

5. In a projection head having an aperture plate and a light tube, means for mounting said plate on said tube, a housing, said light tube being journalled in said housing and means for angularly adjusting said tube with respect to said housing comprising a pair of diametrically opposite shoulders formed on said tube and engaging screws threaded into said housing.

6. In combination, an aperture plate support comprising a light tube having a pair of oppositely disposed shoulders, a housing carrying said light tube, screws threaded in said housing and engaging said shoulders for causing pivotal movement between said housing and said light tube whereby the angular position of said aperture plate may be controlled.

LOUIS SIMON FRAPPIER.
EWALD BOECKING.